United States Patent
Farhi et al.

(10) Patent No.: US 11,973,834 B1
(45) Date of Patent: Apr. 30, 2024

(54) NETWORK TRAFFIC MONITORING AND OPTIMIZATION ENGINE

(71) Applicant: Carbon6 Technologies Inc., Wilmington, DE (US)

(72) Inventors: Albert Farhi, Brooklyn, NY (US); Clayton Atchison, San Juan, PR (US); Kazi Ahmed, Toronto (CA)

(73) Assignee: CARBON6 TECHNOLOGIES INC., Wilmington, DE (US)

( * ) Notice: Subject to any disclaimer, the term of this patent is extended or adjusted under 35 U.S.C. 154(b) by 0 days.

(21) Appl. No.: 18/085,941

(22) Filed: Dec. 21, 2022

(51) Int. Cl.
    *H04L 67/1396* (2022.01)
    *G06Q 30/0204* (2023.01)
    *G06Q 30/0251* (2023.01)
    *H04L 43/16* (2022.01)
    *H04L 47/19* (2022.01)

(52) U.S. Cl.
    CPC ..... *H04L 67/1396* (2022.05); *G06Q 30/0204* (2013.01); *G06Q 30/0269* (2013.01); *H04L 43/16* (2013.01); *H04L 47/19* (2013.01)

(58) Field of Classification Search
    None
    See application file for complete search history.

(56) References Cited

U.S. PATENT DOCUMENTS

| | | | |
|---|---|---|---|
| 8,725,794 B2 | 5/2014 | Kandasamy et al. | |
| 9,129,032 B2 | 9/2015 | Cancel et al. | |
| 9,742,661 B2 | 8/2017 | Klais | |
| 10,178,147 B1* | 1/2019 | Kolam | H04L 67/02 |
| 10,277,650 B1 | 4/2019 | Sei et al. | |
| 10,331,713 B1* | 6/2019 | Chahal | G06F 16/335 |
| 10,536,547 B2 | 1/2020 | Toksoz et al. | |
| 10,616,782 B2 | 4/2020 | Manolarakis et al. | |
| 2003/0023488 A1 | 1/2003 | Landsman et al. | |
| 2015/0163116 A1 | 6/2015 | Ding et al. | |
| 2016/0036831 A1* | 2/2016 | Martini | H04W 12/37 726/26 |
| 2016/0269473 A1* | 9/2016 | Bhogal | H04L 67/535 |

(Continued)

OTHER PUBLICATIONS

Lazova et al., "Personalized TV Distribution to Adaptive HTTP Streaming Clients", Sep. 1, 2018, IEEE, 2018 IEEE 8th International Conference on Consumer Electronics—Berlin (ICCE—Berlin) (pp. 1-6) (Year: 2018).*

(Continued)

*Primary Examiner* — Davoud A Zand
(74) *Attorney, Agent, or Firm* — Perry + Currier

(57) ABSTRACT

The present specification provides a novel network traffic monitoring and optimization engine. In one example system, a target platform and a plurality of content platforms are available for access by a plurality of client devices. The plurality of content platforms can carry primary content for direct consumption and secondary content for suggesting diversion to the target platform. Each content platform may generate unique primary content but be configured to carry similar secondary content for the suggested diversion. The optimization engine is configured to reduce wasted network bandwidth and other computing resources by biasing the secondary content towards the content platforms that more commonly result in generation of secondary content that actually causes diversion to the target platform.

20 Claims, 11 Drawing Sheets

(56) References Cited

U.S. PATENT DOCUMENTS

2017/0132660 A1    5/2017  Barclay et al.

OTHER PUBLICATIONS

Amazon ADS, "Amazon Attribution", advertising.amazon.com, 2015, Retrieved from the Internet on Feb. 3, 2023, from URL: https://advertising.amazon.com/solutions/products/amazon-attribution.

Savic, Nikola, "Google Ads Parallel Tracking", ThriveTracker, 2020, Retrieved from the Internet on Feb. 6, 2023 from URL: https://support.thrivetracker.com/hc/en-us/articles/360011408114-Google-Ads-Parallel-Tracking.

Surlan, Stefan, "All About Tracking URLs and Postbacks and Pixels", ThriveTracker, 2019, Retrieved from the Internet on Feb. 6, 2023 from URL: https://support.thrivetracker.com/hc/en-us/articles/360020232013-All-About-Tracking-URLs-and-Postbacks-and-Pixels.

Kirti, "How to Import Amazon Attribution Data in Google Ads", Karooya.com, Oct. 8, 2021, Retrieved from the Internet on Feb. 6, 2023 from URL: https://www.karooya.com/blog/amazon-attribution-data-google-ads-conversions/.

Melnychuk, Victoria, "How PPC Makes Your Product Rank Higher on Amazon?", profitwhales.com, Nov. 18, 2021, Retrieved from the Internet on Feb. 6, 2023 from URL: https://profitwhales.com/archives/articles/how-ppc-improves-amazon-ranking.

Johnson, Robyn, "How to use Amazon Attribution and Brand Referral Bonus Programs", searchenginejournal.com, Jan. 17, 2022, Retrieved from the Internet on Feb. 6, 2023 from URL: https://www.searchenginejournal.com/amazon-attribution-brand-referral/432212/.

Doina, "Get started with Pixelfy: Guide for Amazon Sellers", pixelfy.me, Apr. 29, 2022, Retrieved from the Internet on Feb. 6, 2023 from URL: https://pixelfy.me/blog/pixelfy-amazon-sellers/.

Adwords API, "Click Tracking in Google Ads", developers.google.com, 2021, https://developers.google.com/adwords/api/sunset, Retrieved from the WayBackMachine on Apr. 13, 2023 from URL: https://web.archive.org/web/20220323152821/https://developers.google.com/adwords/api/docs/guides/click-tracking.

* cited by examiner

NETWORK TRAFFIC MONITORING AND OPTIMIZATION ENGINE

BACKGROUND

Communication activity on the modern Internet is distributed amongst many different server platforms offering a variety of content to millions of different client devices. The volume and diversity of content also varies amongst platforms, and certain platforms offer similar types of content and thus compete for connections from the same client devices. Furthermore, many platforms may carry additional content intended to cause input from client devices that will divert traffic to another platform. This overall system can lead to chaotic behaviour and result in significantly inefficient use of network resources and accompanying inefficient use of processing and memory resources of the client devices and servers generating such traffic.

DETAILED DESCRIPTION

Figure 1:
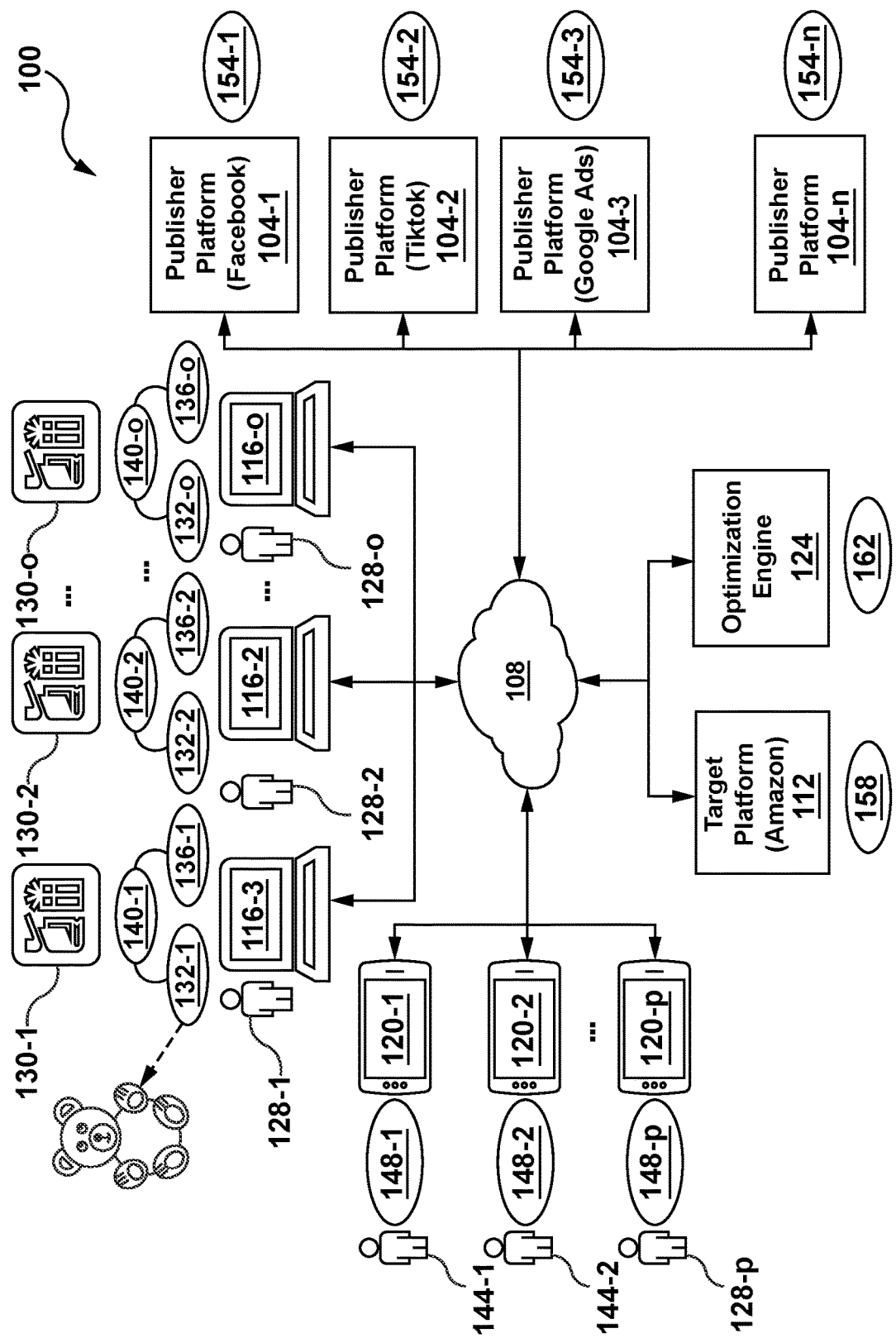
FIG. 1 is a schematic diagram of a system for network traffic monitoring and optimization.

An aspect of the present specification provides a novel network traffic monitoring and optimization engine. In one example system, a target platform and a plurality of content platforms are available for access by a plurality of client devices. The plurality of content platforms can carry primary content for direct consumption and secondary content for suggesting diversion to the target platform. Each content platform may generate unique primary content but be configured to carry similar secondary content for the suggested diversion. The optimization engine is configured to reduce wasted network bandwidth and other computing resources by biasing the secondary content towards the content platforms that more commonly result in generation of secondary content that actually causes diversion to the target platform.

An aspect of the specification provides an optimization engine comprising a memory and a processor coupled to the memory. The processor can be configured to receive a communication from a plurality of content platforms. Each of the content platforms can generate diversionary or secondary content that includes a link. A plurality of client devices can also access the content platforms. When the link is selected at a client device, this will cause the initial communication that is received at the processor. The link further includes a target platform identifier and a content platform identifier of the content platform that was hosting the diversionary content of the link that caused the initial communication. The processor can also be configured to determine a ranking of a frequency of the number of times that the link for each of the plurality of content platforms is accessed by one or more client devices. The processor can also be configured to selectively decrease generation of the diversion content on a subset of the content platforms that fall below a threshold level of the frequency. Such decreasing is one of the ways that network resource optimization can be achieved.

The processor can be configured to bias generation of the content towards a subset of the content platforms that exceed the threshold level.

The processor can be further configured to cause the client device to divert access from the one platform to a target platform associated with the target platform identifier.

The processor can be further configured to receive a client device identifier for storage in the memory for causing the client device to divert access from the one platform to a different location on the target platform if the client device has previously accessed the link from any of the content platforms.

The content platforms can generate primary content respective to the platform and the diversion content is generated alongside a subset of the primary content by client devices associated with certain demographics that favor the primary content.

The client device identifier can include a user identifier and the demographics are associated with a user associated with the user identifier.

The demographics can be adjusted to favor different primary content on the same platforms when the threshold falls below a certain level.

The link can be based on a hidden pixel embedded inside the diversion content and the diversion content is an advertisement for a product being sold on the target platform.

The ranking can be based on a correlation between a normalization of disparately formatted reports from at least one of the target platform and the content platforms.

Other aspects of the specification contemplate systems, methods and computer readable media configured according to the foregoing and the subsequent text.

FIG. 1 shows a system for network traffic monitoring and optimization indicated generally at 100. System 100 comprises a plurality of publisher platforms 104-1, 104-2 . . . 104-n. (Collectively, platforms 104-1, 104-2 . . . 104-n are referred to as platforms 104, and generically, as platform 104. This nomenclature is used elsewhere herein.) In system 100, platforms 104 connect to a network 108 such as the Internet. Network 108 interconnects publisher platforms 104 with: a) at least one target platform 112; b) at least one configuration workstation 116; c) a plurality of client devices 120 and, d) a traffic monitoring and optimization engine 124.

Platforms 104 can be based on any present or future electronic media servers that publish content for client devices 120. Client devices 120 can be any type of human-machine interface for interacting with platforms 104. For example, client devices 120 can include traditional laptop computers, desktop computers, mobile phones, tablet computers and any other device that can be used to receive content via one or more of the platforms 104 that complement the input and output hardware devices associated with a given client device 120. It is contemplated client devices 120 can include virtual or augmented reality gear.

In a present example embodiment, platforms 104 are based on social media platforms such as Facebook, TikTok and/or any within an application platform eco-system like Google including YouTube, Google Maps, Google Search, Google News, etc. and/or other publisher platforms that carry primary content and also carry secondary content in the form of advertising from services such as Google Ads, that embed advertising content into content provided by other websites or apps. (Secondary content is sometimes referred to as diversion content or diversionary content herein). As will be explained further below, in general, platforms 104 carry primary content for consumption by client devices 120 and secondary content for presentation alongside the primary content. Primary content can include web pages, social media, audio, video, movies, television, books, news, search results, and the like. Secondary content is typically generated in association with the primary content and, in a present embodiment, is typically advertising. Secondary content is thus any content that, when accessed or selected by a given client device 120, diverts that client device 120 to connect with another platform, such as target platform 112. For purposes of illustrative explanation, the following discussion frequently refers to an example embodiment as applied to platforms 112 based on Facebook, TikTok and Google Ads (as embedded into another website or other web service), but it is to be understood these are non-limiting examples of platforms 112 and that analogues are contemplated, especially as the Internet and the entities that participate with it continue to evolve.

Target platform 112 can also be based on any present or future electronic servers that publish content for client devices 120, and to which a diversion from a platform 104 may occur. In a present example embodiment, target platform 112 is based on an e-commerce platform such as Amazon, Wayfair or Etsy. As will be explained further below, in general, such e-commerce target platforms 112 generally include a sales workflow or interactive sales functions for client devices 120, representing a customer experience sales funnel, including product searching, product browsing, adding a product to shopping cart, checkout, payment processing, shipment tracking and may additionally include other workflow functions such as product customization (e.g. clothing size or color selection), subscription (e.g. a recurring order of a consumable product such as shampoo). Return and refund functions may also be provided. E-commerce platforms that primarily sell services, such as Upwork or Task Rabbit, are also contemplated. For purposes of illustrative explanation, however, the following discussion may refer to an example embodiment as applied to Amazon, but it is to be understood that Amazon is a non-limiting example and that analogues to Amazon are contemplated.

Accordingly, configuration workstations 116 are based on computing devices and used by administrators 128 of vendors 130 that sell at least one product on target platform 112. (In variants, vendors 130 may sell services and/or products). Configuration workstations 116 can be desktop workstations, laptop computers, tablet computers or cellular telephones. Each configuration workstation 116 and its administrator 128 is thus associated with different respective identifier objects including a product identifier object 132, a product campaign identifier object 136 and an optimization engine identifier object 140.

A person of skill in the art is to recognize that the form of an identifier object is not particularly limited, and in a simple example embodiment, can be simply as an alpha-numerical sequence that is entirely unique in relation to other identifier objects in system 100. Identifier objects can also be more complex as they may be combinations of account credentials (e.g. user name, password, Two-factor authentication token, etc.) that first uniquely identify a given vendor 130 and then a sub-identifier (e.g. alpha-numeric sequence) that uniquely identifies a given product (as in the case of a product identifier object 132), a given advertising campaign (as in the case of product campaign identifier object 136), and a given association between the product identifier object 132 and the campaign identifier object 136 (as in the case of optimization engine identifier object 140). Identifier objects themselves may also be indexes that point to other identifier objects. The salient point is that they are uniquely identifiable within system 100 in association with what they represent.

The product identifiers 132 are electronic identifiers that represent products offered for sale on target platform 112 to consumer entities 144 operating a respective client device 120. Each consumer entity 144 (sometimes referred to as users) accesses target platform 112 via a respective consumer identifier object 148, whereby the workflow or sales funnel experience is managed by way of interactions over system 100. Administrators 128 can create sales-content on target platform 112 for a given product identifier 132. The sales-content can be based on the sales funnel experience functionality of target platform 112 as specifically applied to a given product respective to the product identifier 132. Product identifiers 132 are typically associated with a vendor account (for each vendor 130) that is hosted by target platform 112 that creates an overall association between target platform 112 and the respective vendor 130. Product identifiers 132 will be discussed in greater detail below.

The campaign identifiers 136 are electronic identifiers that represent advertising campaigns associated with a respective product identifier object 132. Such advertising campaigns are intended for delivery as secondary content on publisher platforms 104 to client devices 120. As previously noted, the purpose of such secondary content is to attempt causation of diversion of traffic from a client device 120 accessing a platform 104 to the sales funnel experience of the product identifier object 132 on target platform 112. Such campaign identifier objects 136 are typically associated with a vendor account (for each vendor 130) that is hosted by optimization engine 124 that administers a given product advertising campaign on one or more platforms 104. A sub-campaign identifier object for each platform 104 respective to a specific campaign identifier object 136 is contemplated. Campaign identifier objects 136 will be discussed in greater detail below.

The optimization engine identifier objects 140 are electronic identifier objects used by optimization engine 124 to provide a bridge between product identifier objects 132 (including associated sales funnel traffic on target platform 112) and campaign identifier objects 136 (including associated advertising traffic on platforms 104). Such a bridge can be used to monitor and optimize the flow of traffic diversions of client devices 120 from platforms 104 to target platform 112, and eventually bias advertising campaigns in order towards increasing the number of diversions to target platform 112 and/or to improve the ratio of: a) pure advertising impressions to platforms 104 to b) selections or "clicking on" the advertising campaign that cause an actual diversion to target platform 112. In this manner, one of the technical benefits of the present specification is achieved as delivery of secondary content (e.g. an advertising campaign associated with a campaign identifier object 136) to client devices 120 are decreased on platforms 104 that result in fewer or no traffic diversions from client devices 120 to target platform 112, as compared to other platforms 104 where delivery of the same secondary content (e.g. the same advertising campaign associated with the same campaign identifier object 136) results in a greater number of traffic diversions of client devices 120 from a given publisher platform 104 to target platform 112. Additional or different optimization may be achieved by adjusting target demographics of a campaign on a given platform 104. Accordingly, wasted communication resources (in the form of ignored advertising campaigns) between client devices 120 and respective publisher platforms 104 are reduced, thereby increasing the overall computing, memory and communication resources of system 100. The optimization engine identifiers 140 and optimization engine 124 will be discussed in greater detail below.

Consumer entities 144, sometimes referred to as users herein, are typically individuals but may be corporate entities as well. Such entities 144 interact, via devices 120, with both publisher platforms 104 as well as target platform 112. Each consumer identifier object 148 is used by other nodes in system 100, including publisher platforms 104, target platform 112 and optimization engine 124 to track: a) traffic flows between a given client device 120 and various publisher platforms 104, including interactions (impressions as well as diversions) with a given advertising campaign associated with a given campaign identifier object 136; b) traffic flows between a given client device 120 and target platform 112, including interactions respective to a given product identifier object 132 and the navigation through the sales funnel experience for the respective product; and c) diversions of traffic originated by a given client device 120 from a given publisher platform 104 to target platform 112, including diversions relating to specific campaign identifier objects 136 and associated product identifier objects 132. Consumer identifier objects 148 may be implemented as a plurality of consumer identifier sub-objects that are bridged by optimization engine 124 in similar fashion to the previously-described bridging function performed by optimization engine identifier object 140 between a respective product identifier object 132 and a respective campaign identifier object 136. Consumer identifier sub-objects (of consumer identifier objects 148) may also be provided to anonymize, for privacy purposes, to protect the specific identity of the associated consumer entity 144. Where a plurality of consumer identifier sub-objects (each respective to a given client device 120 and/or consumer entity 144) are used to implement a consumer identifier object 148, then some of those identifier objects may be anonymous or private to certain nodes in system 100 while being non-private to other nodes. For example, the operator of target platform 112 will maintain an account (a form of consumer identifier sub-object) respective to each consumer entity 144 that expressly identifies the consumer entity 144 in order to handle delivery and payment processing. At the same time, the operator of publisher platform 104 need not expressly identify a given consumer entity 144 in order to fulfill its advertising campaign functions, but can instead rely upon, (via "cookies", type of identifier sub-object, or the like), generic demographic information respective to the consumer entity 144 that permits targeting of the advertising campaign while respecting the individual anonymity of the consumer entity 144. In certain embodiments, it is contemplated that a consumer identifier sub-object of the consumer identifier object 148 may comprise a cookie that is used by a publisher platform 104, whereas another consumer identifier sub-object of the consumer identifier object 148 may comprise the account information of the consumer entity 144 as used by target platform 112. However, for simplification of explanation of the present embodiment, a single consumer identifier object 148 for each consumer entity 144 is assumed to be available to all nodes of system 100, regardless of privacy and/or anonymity concerns, but a person skilled in the art will now appreciate such simplification and will understand how to implement the plurality of consumer identifier sub-objects bound together, conceptually, by the consumer identifier object 148 discussed herein.

Persons skilled in the art will recognize that there are many different types of interactions between client devices 120 accessing platforms 104, and that there are also many different ways such interactions may lead to diversions that cause a given client device 120 to access target platform 112. For example, it is possible that there will be repeated diversions from the same or different platforms 104 during different stages in the sales funnel experience of target platform 112. For example, client device 120-1 may access platform 104-1 and be exposed to an advertisement connected to campaign identifier 136-1 that causes client device 120-1 to direct traffic to an "offer for sale" web page on platform 112 that is offering a product for sale from vendor 130-1 that is respective to product identifier 132-1. As part of the sales funnel experience, the client device 120-1 may send input that "adds" that product to a virtual "shopping cart" on target platform 112, but client device 120-1 may not, during the same session, send input that completes the "checkout" portion of the sales funnel experience. This incomplete sales funnel experience can then be logged within system 100 such that, during a subsequent access from client device 120-1 to platform 104-1, there may be exposure to another advertisement also based on campaign identifier 136-1, that causes traffic from client device 120-1 to be directed to a "checkout" web page on platform 112, urging completion of the "checkout" or purchasing portion of the sales funnel experience. To reiterate, this is but one example and with the benefit of further study of this specification a person of skill in the art will appreciate how the present teachings can be applied to these different types of interactions between client devices 120, publisher platforms 104 and the sales funnel experience on target platform 112.

It is contemplated that each publisher platform 104 has a campaign publisher-reporting tool application 154 stored in non-volatile storage of the respective platform 104 and executable on its processor. The publisher-reporting application 154 can be accessed by each administrator 128 to run reports for a respective campaign identifier object 136 to track the number of impressions and/or diversions (if any) from the respective publisher platform 104 to target platform 112 that are associated with each consumer identifier object 148. It is notable, however, that each publisher publisher-reporting application 154 may generate such reports in different formats and at different time intervals, and accordingly, as will be discussed in greater detail below, optimization engine 124 can also access publisher-reporting application 154 in order to create a meta-report via a optimization-reporting application 162 that normalizes the reports from each publisher-reporting application 154 for each campaign identifier 136 to thereby simplify the process of comparing the relative success of a given advertising campaign on each publisher platform 104.

It is contemplated that target platform 112 also includes a target-reporting application 158 stored in non-volatile storage and executable on its processor. The target-reporting application 158 can be used by each administrator 128 to track the various stages of the sales funnel experience for an consumer identifier object 148 in relation to a given product identifier object 132. It is notable, however, that the target-reporting application 158 generates reports in a different format and at different time intervals than publisher-reporting applications 154 for each platform publisher 104, and accordingly, as will be discussed in greater detail below, optimization engine 124 can also access reporting tool application 158 on target platform 112 via optimization-reporting application 162 to provide normalized reports based on: a) the reports from each publisher-reporting application 154 for each campaign identifier 136; with b) reports from target-reporting application 158 for each product identifier 132. Such normalized reports thereby simplify the process of comparing the relative progress through the sales funnel experience, including actual sales conversions, associated with a given advertising campaign on each publisher platform 104 for a respective product. In turn, the normalized reports can be used to adjust advertising campaigns and/or control which platform servers 104 are provided with advertising campaigns, thereby reducing or eliminating wasted delivery (and associated waste of communication and other computing resources) of advertising campaigns from publisher platforms 104 that do not result in diversions to target platform 112.

Figure 2:
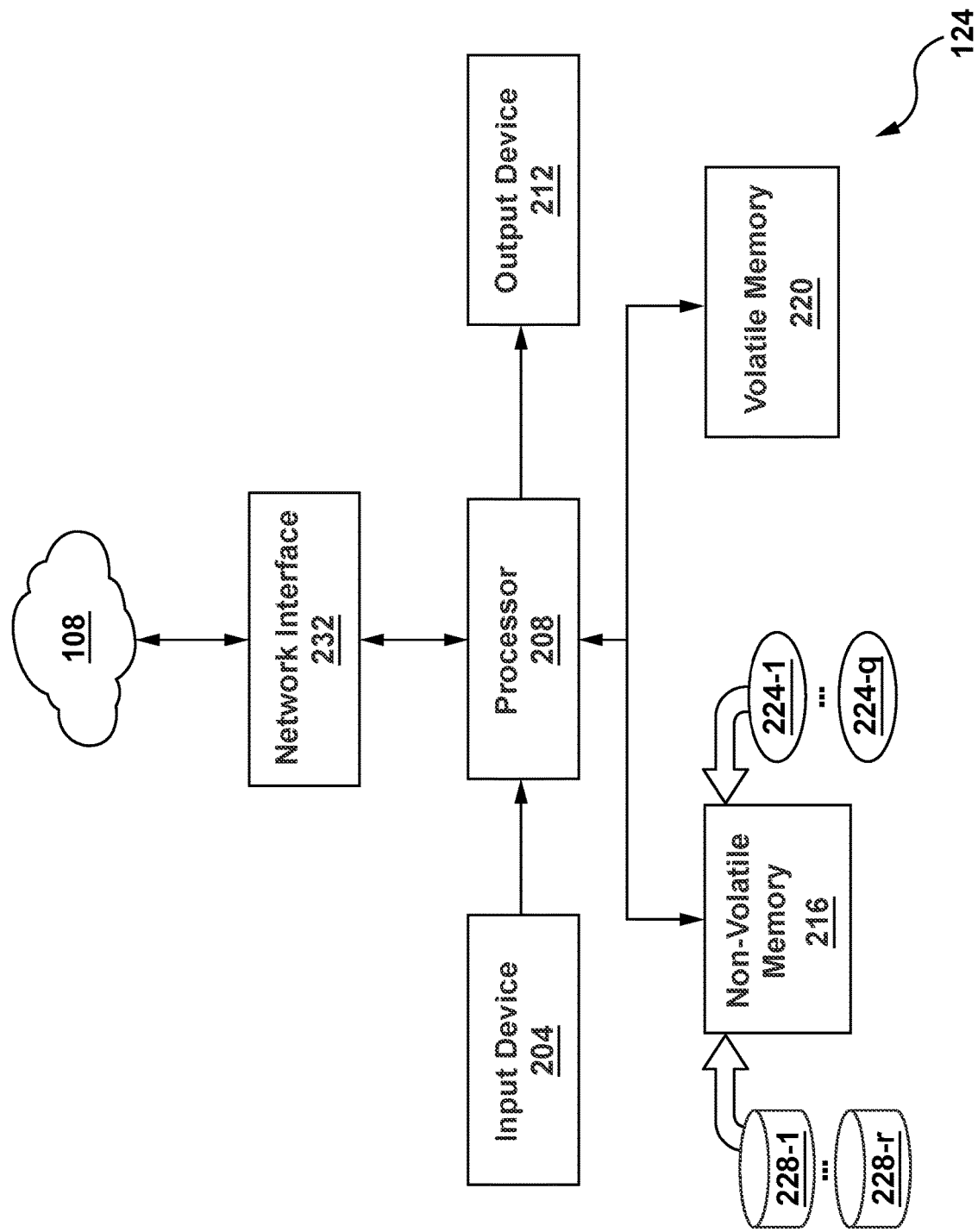
FIG. 2 is a block diagram of example internal components of the optimization engine of FIG. 1.

Having described an overview of system 100, it is useful to comment on the hardware infrastructure of system 100. FIG. 2 shows a schematic diagram of a non-limiting example of internal components of optimization engine 124.

In this example, optimization engine 124 includes at least one input device 204. Input from device 204 is received at a processor 208 which in turn controls an output device 212. Input device 204 can be a traditional keyboard and/or mouse to provide physical input. Likewise output device 212 can be a display. In variants, additional and/or other input devices 204 or output devices 212 are contemplated or may be omitted altogether as the context requires.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of hard-disk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 108 via a network interface 232. Network interface 232 can also be used to connect another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. One or more tables or databases 228 can also be maintained in non-volatile memory 216 for use by applications 224.

The infrastructure of optimization engine 124, or a variant thereon, can be used to implement any of the computing nodes in system 100, including platforms 104 and target platform 112. Furthermore, optimization engine 124, platforms 104 and target platform 112 may also be implemented as virtual machines and/or with mirror images to provide load balancing.

Furthermore, a person of skill in the art will recognize that the core elements of processor 208, input device 204, output device 212, non-volatile memory 216, volatile memory 220 and network interface 232, as described in relation to the server environment of optimization engine 124, have analogues in the different form factors of client machines such as those that can be used to implement configuration workstations 116 and client devices 120. Again, configuration workstations 116 and client devices 120 can be based on computer workstations, laptop computers, tablet computers, mobile telephony devices or the like.

Figure 3:
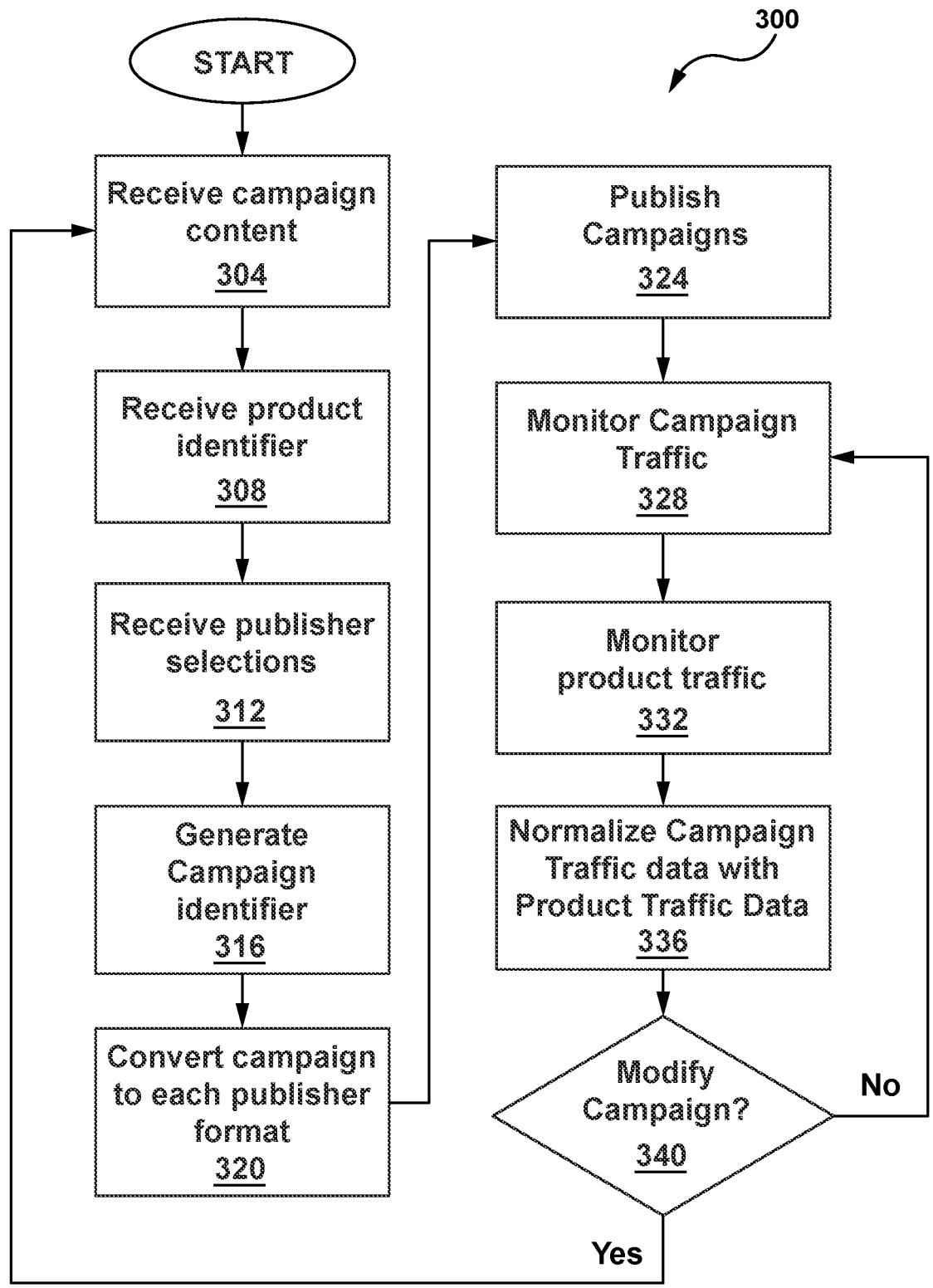
FIG. 3 shows a flowchart depicting a method for network traffic monitoring and optimization.

FIG. 3 shows a flowchart depicting a method for network traffic monitoring and optimization indicated generally at 300. Method 300 can be implemented on system 100. Persons skilled in the art may choose to implement method 300 on system 100 or variants thereon, or with certain blocks omitted, performed in parallel or in a different order than shown. Method 300 can thus also be varied. However, for purposes of explanation, method 300 will be described in relation to its performance on system 100 with a specific focus on treating method 300 as application 224-1 maintained within optimization engine 124 and its interactions with the other nodes in system 100.

Figure 4:
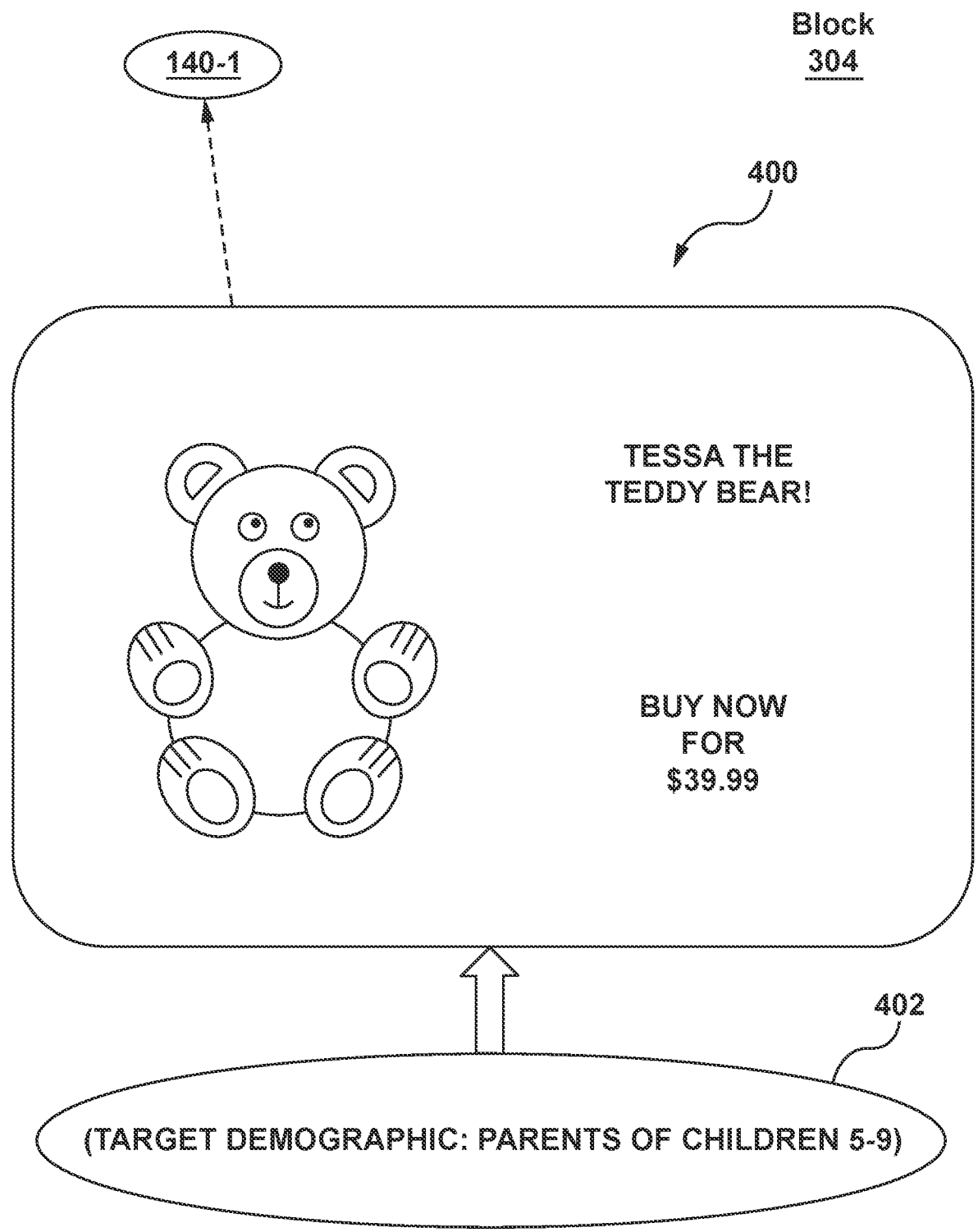
FIG. 4 shows an example campaign that can be generated using the method of FIG. 4.

Block 304 comprises receiving campaign content. In system 100, block 304 is performed by optimization engine 124, which receives secondary content in the form of an advertising campaign for a vendor 130 from an administrator 128 operating configuration workstation 116. In the specific example of system 100, where vendor 130-1 creates a campaign on workstation 116-1, optimization engine 124 associates the campaign content with optimization engine identifier object 140-1. FIG. 4 shows example campaign 400, built from campaign content received at block 304, which is associated with optimization engine identifier 140-1. Campaign 400 is a banner advertisement for a product called "Tessa The Teddy Bear" being offered for sale on target platform 112 by vendor 130-1 for a price of $39.99. When deployed on publisher platforms 104, the intention is to divert traffic from publisher platforms to the customer experience sales funnel for "Tessa The Teddy Bear". Again, the format of the secondary content advertisement is not particularly limited, FIG. 4 is merely an example.

Optionally, but typically, the campaign content at block 304 will also include target demographic information 402 for the campaign content. Demographic information 402 can be utilized by platforms 104, to determine a subset of client devices 120 to receive the campaign content. That subset of client devices 120 can be based on a match with the demographic information associated with each consumer identifier object 148. To give an illustrative example, "Tessa The Teddy Bear" may be targeted specifically at children between the ages of 5 and 9, and therefore the target demographic information 402 associated with campaign 400 would focus on parents with children within this age range.

Figure 5:
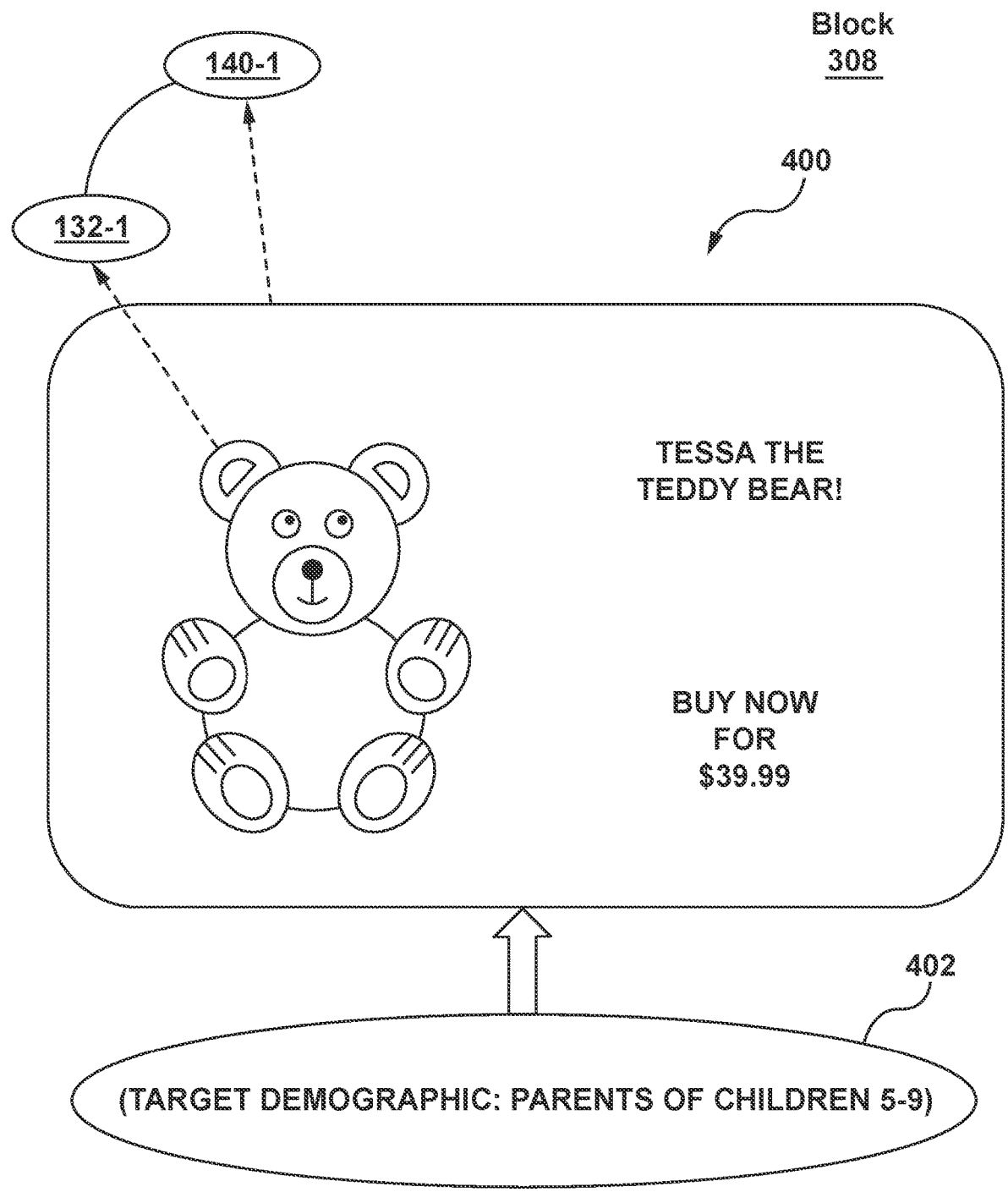
FIG. 5 shows an example of how the campaign of FIG. 4 can be associated with a product identifier.

Referring again to FIG. 3, block 308 comprises receiving a product identifier. The product identifier is associated with the contents of the campaign from block 304. Continuing with the specific example of system 100 and vendor 130-1, product identifier object 132-1 becomes associated with optimization engine identifier object 140-1. As shown in FIG. 5, the image of "Tessa The Teddy Bear" is associated with product identifier object 132-1. Thus the campaign 400 from block 304 and the product identifier object 132-1 from block 308 are now both associated with optimization engine identifier object 140-1.

Accordingly, the secondary content (i.e. the advertising) promotes the product associated with product identifier object 132-1 and is intended for dissemination on one or more publisher platforms 104 for generation on devices 120 accessing those platforms 104, or a subset of devices 120 that are accessing those platforms 104 that have a consumer identifier object 148 consistent with the target demographic information associated with campaign 400.

Referring again to FIG. 3, block 312 comprises receiving publisher selections. Continuing with the specific example of system 100 and vendor 130-1, administrator 128-1 operates configuration workstation 116-1 to indicate which platforms 104 are to deploy the campaign 400 from block 304. Typically only a subset of platforms 104 are selected. According to the present illustrative example, it will be assumed that the selected platforms are platform 104-1, platform 104-2 and platform 104-3, and that: platform 104-1 is Facebook; platform 104-2 is TikTok; and platform 104-3 is Google Ads. It will be therefore assumed that the remaining platforms 104 are not selected.

(Note that Facebook and TikTok maintain their own eco-systems of primary content while also controlling their own secondary content in the form of advertising. In contrast, Google Ads, inserts secondary content in the form of advertising, alongside the primary content of other platforms 104, where those other platforms 104 only maintain primary content and rely on Google Ads to insert the secondary content. These nuances between different platform publishers, such as, Facebook, TikTok and Google Ads are not strictly represented in FIG. 1 but will be appreciated by persons skilled in the art.)

Figure 6:
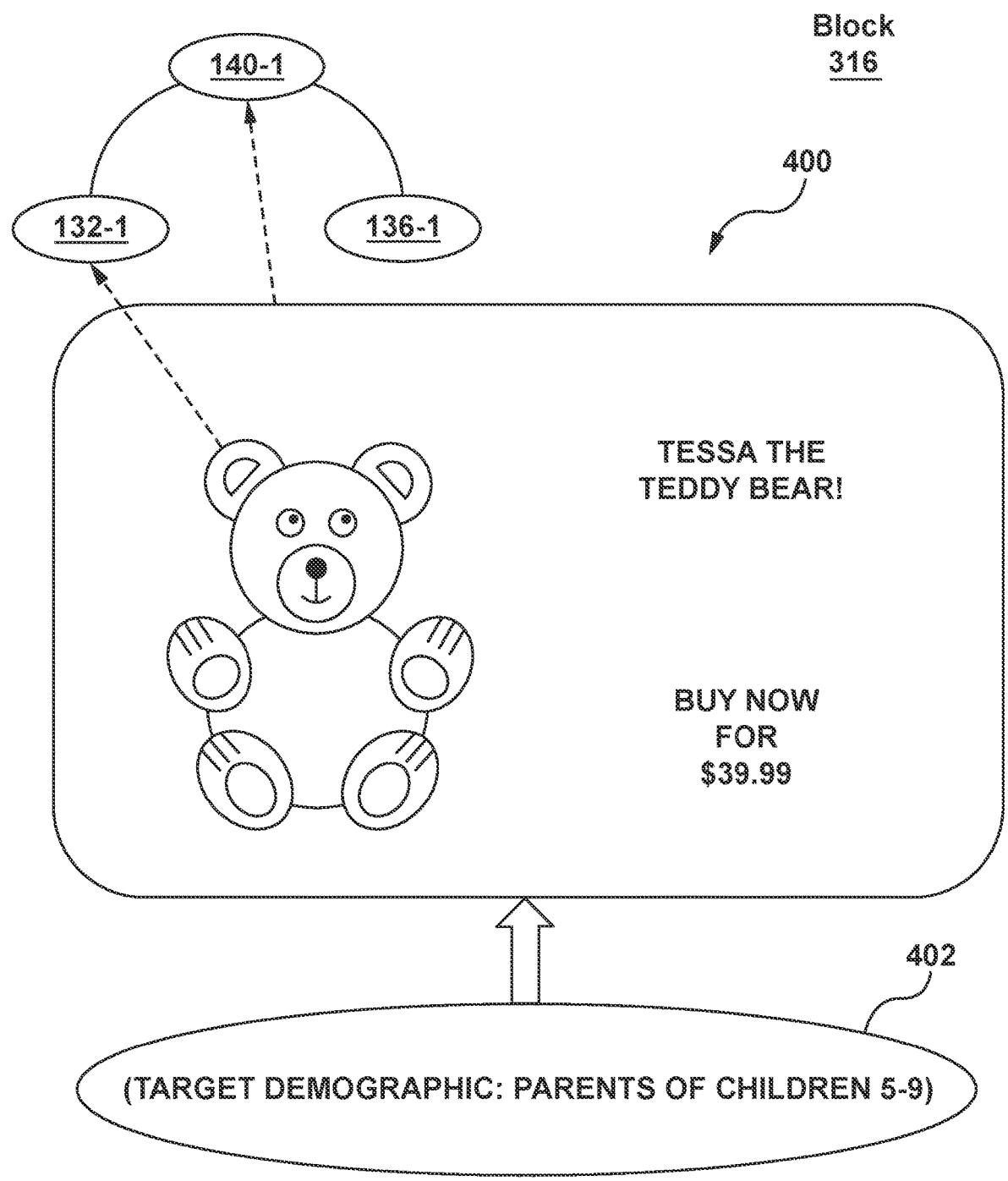
FIG. 6 shows an example of how the campaign of FIG. 4 can be assigned a campaign identifier.

Referring again to FIG. 3, block 316 comprises generating a campaign identifier. According to the present embodiment of system 100, the campaign identifier is generated by optimization engine 124, but in other embodiments the campaign identifier could be generated by one or more other nodes in system 100, such as platforms 104. Continuing with the foregoing specific example campaign identifier 136-1 is generated by optimization engine 124. Performance of block 316 is represented in FIG. 6.

Block 320 comprises converting the campaign content to the format of each publisher. To elaborate, since each platform 104 hosts primary and secondary content in it is own way, campaign 400 can be adjusted to adapt to any specific formatting conventions or other technical specifications or limitations of that platform 104. A wide variety of formatting variables are contemplated including visible variables such as sizing, colors, fonts, the inclusions of animated GIFs or audio clips. Non-visible formatting variables include mapping demographic information 402 to pre-defined field structures that may vary between platforms 104. The conversion can be performed automatically by optimization engine 124 using a rule-set respective to each platform 104, or manually, by, for example, administrator 128 operating workstation 116. Other ways of performing the conversion will occur to those skilled in the art. The conversion at block 320 also typically includes providing a campaign identifier sub-object that is subordinate to campaign identifier object 136-1, but which uniquely identifies the campaign as that campaign has been specifically formatted for a particular platform 104.

Figure 7:
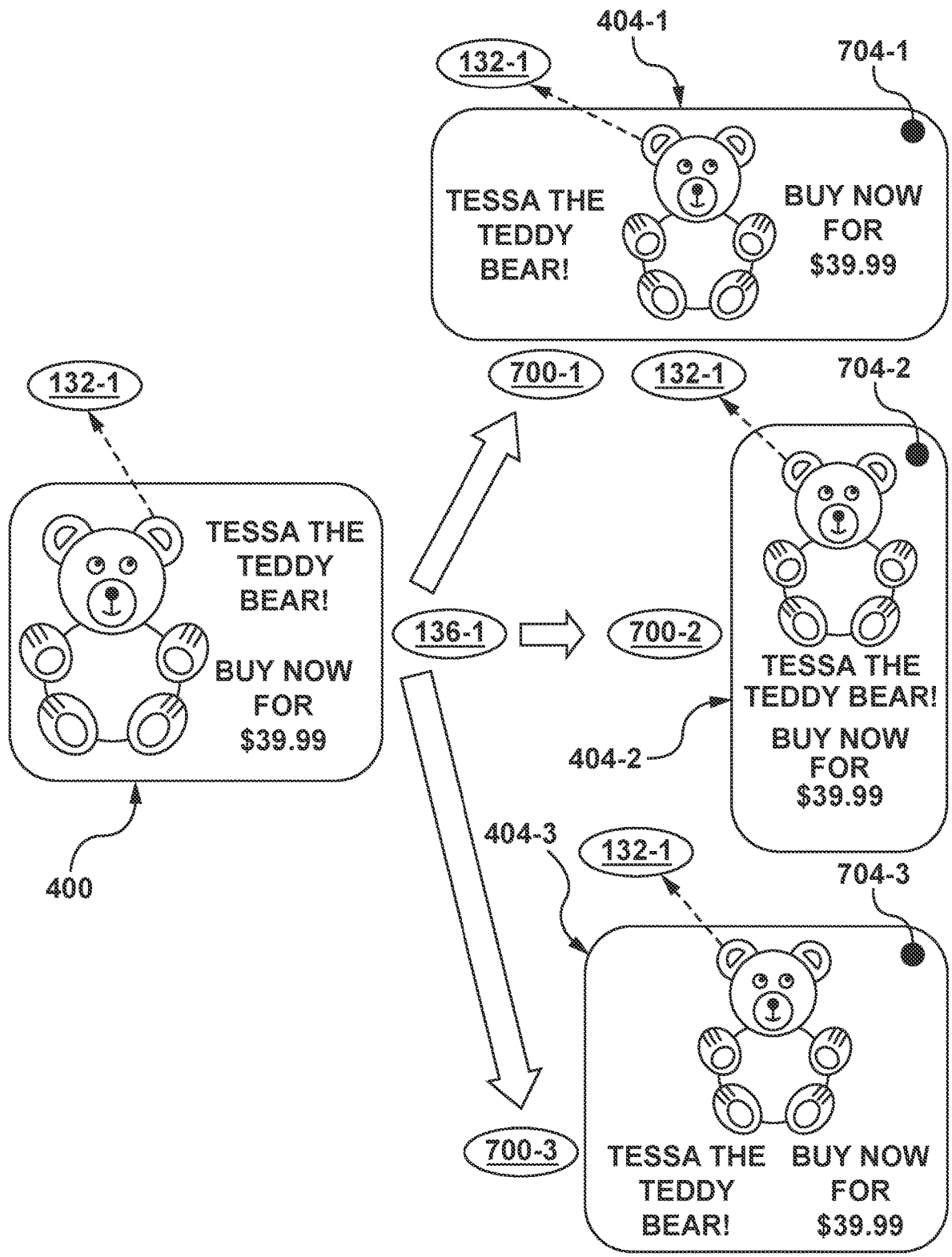
FIG. 7 shows an example of how the campaign of FIG. 4 can be converted for publication to different platforms.

Block 320 is further explained in relation to FIG. 7, whereby campaign 400 is converted to: a) campaign 404-1 for publishing on platform 104-1; b) campaign 404-2 for publishing on platform 104-2; and c) campaign 404-3 for publishing on platform 104-3. (The target demographic information 402, as converted to the format of the respective platform 104, is not shown in FIG. 7 as part of each campaign 404, but is intended to be implicit for this example.) Also notable in FIG. 7 is the assignment of campaign identifier sub-objects 700 respective to each campaign 404. Campaign identifier sub-objects 700 are used by platforms 104 to uniquely identify the respective campaign 404, and also used by optimization engine 124 to monitor the performance of each campaign 404. Campaign identifier sub-objects 700 also serve to directly associate campaign 400 with the respective product identifier 132-1, such that selection of a given campaign 404 by a client device 120 accessing a respective platform 104 diverts traffic from that platform 104 to target platform 112 and specifically to the customer experience sales funnel on target platform 112 respective to product identifier 132-1.

Also notable at block 320 is the embedding of an active token 704 within each campaign 404. Token 704 can be implemented in many ways, but in a present embodiment is implemented as a single pixel anywhere within campaign 404. The pixel need not be visible to the human eye. The pixel can include a hyperlink or other network addressable token that is automatically activated when the campaign 404 is selected or "clicked on" by a client device 120. Each token 704 includes the address of optimization engine 124 on network 108. Each token 704 is configured to append the corresponding campaign identifier sub-object 700 and the consumer identifier object 148 (associated with the relevant client device 120) to the network address of the optimization engine 124, such that when a given campaign 404 creates an impression on a given client device 120, selecting or "clicking on" the campaign 404 activates the token 404 and causes a penultimate diversion to target platform 112 via optimization engine 124, which tracks the selection.

Figure 8:
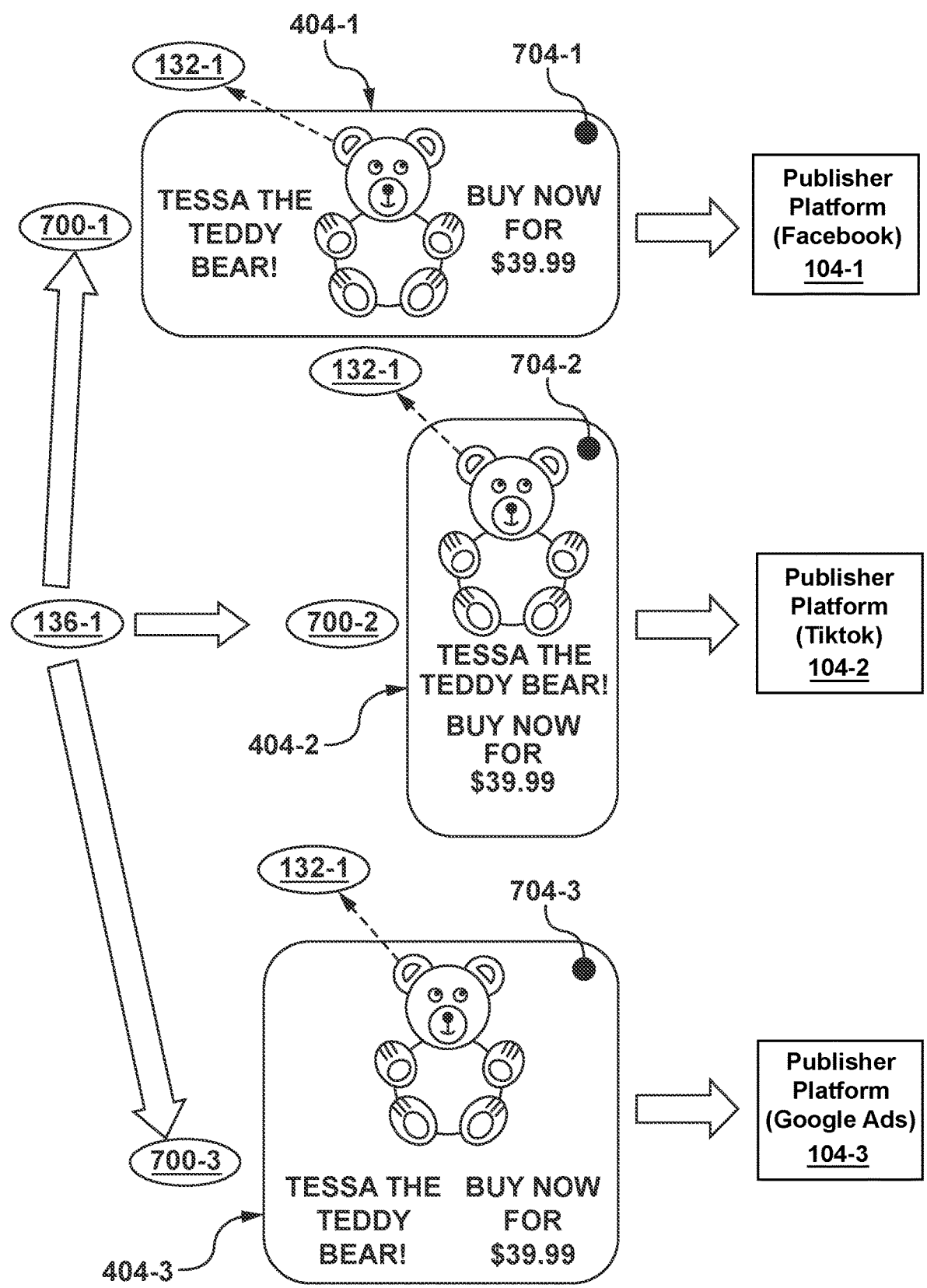
FIG. 8 shows an example of the publication of the campaigns from FIG. 7 to their respective platforms.

Block 324 comprises publishing the converted campaigns from block 320 onto the selected publisher platforms from block 312. Block 324 is represented according to the specific example in FIG. 8, whereby: a) campaign 404-1 is pushed for publication on platform 104-1; b) campaign 404-2 is pushed for publication on platform 104-2; and c) campaign 404-3 is pushed for publication on platform 104-3.

At this point the regular functioning of platforms 104 proceeds in the usual fashion, as various client machines 120 access each platform 104 and subsets of those client machines 120 have campaigns 404 periodically pushed to those client machines 120. More successful campaigns 404 will result in more diversions of traffic to target platform 112 in relation to product identifier 132-1.

Figure 9:
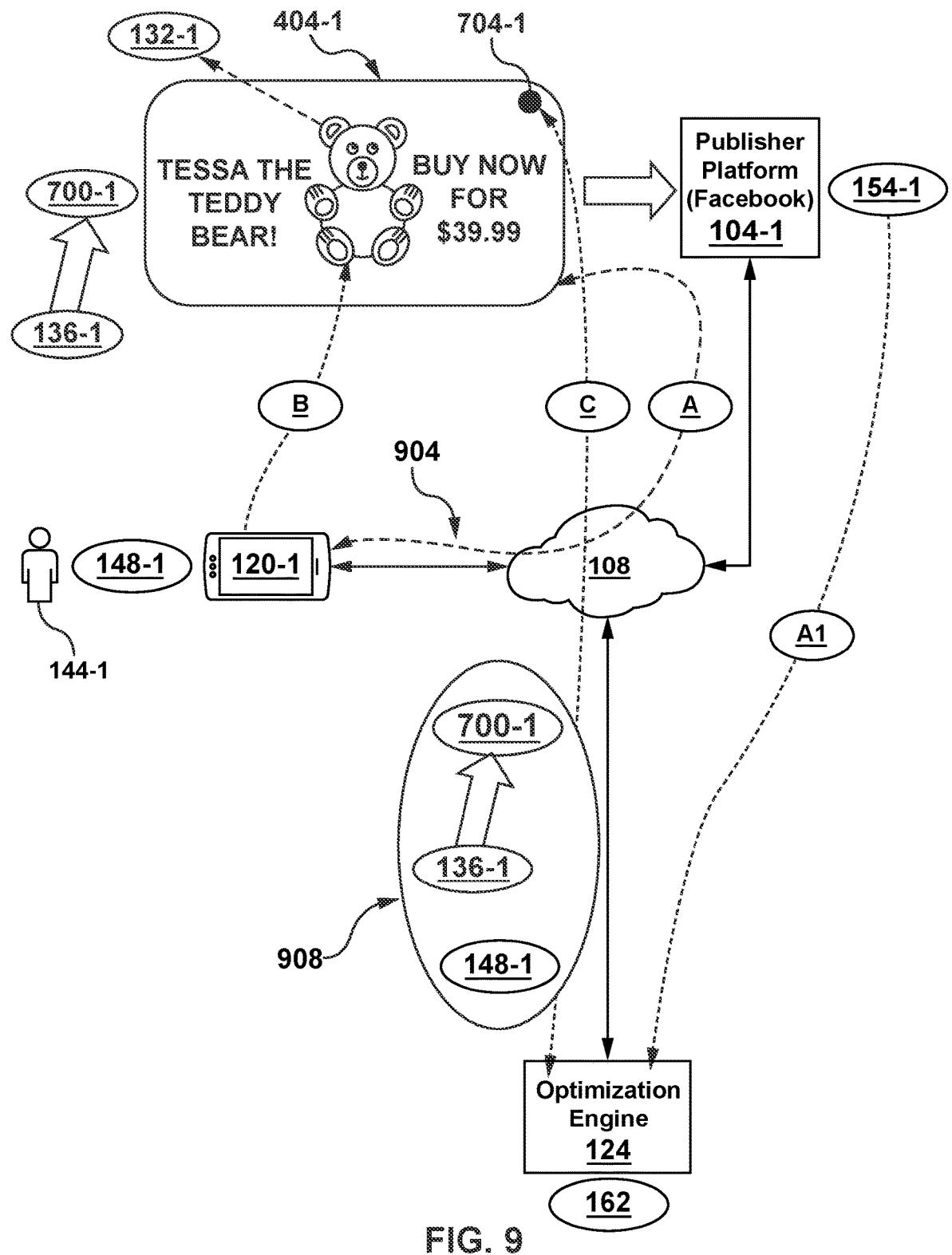
FIG. 9 shows an example of monitoring traffic.

Block 328 comprises monitoring campaign traffic. In general terms, such monitoring includes recording which client devices 120 access which campaigns 404. A specific example of how block 328 can be implemented will be discussed in relation to FIG. 9. FIG. 9 is a subset of system 100. FIG. 9 shows certain functionality of published campaigns, whereby campaign 404-1 is shown as published on platform 104-1 and being accessed by client device 120-1 over a session 904. Session 904 is denoted by a curved dashed line with bi-directional arrows to represent the session. The dashed line representing session 904 is also labelled with an "A" to indicate that session 904 is in the sequence of communication events shown in FIG. 9. Session 904 typically includes generation of primary content, not shown, that is accessed by client device 120-1, in addition to the generation of secondary content in the form of campaign 404-1.

A person skilled in the art will now recognize that publisher platform 104-1 was configured to generate campaign 404-1 on device 120-1 based on any known criteria, such as the type of primary content being accessed and/or known demographic information associated with consumer identifier object 148-1. Publisher-reporting application 154-1 tracks the generation (i.e. an "impression") of campaign 404-1 on device 120-1 including consumer identifier object 148-1, in the usual fashion according to the native functionality of platform 104-1. Accordingly, the "monitoring" function of block 328 is fulfilled once the contents of publisher-reporting application 154 are sent to optimization engine 124. (See the dashed line labelled "A1".)

At this point, other than the recording of this "impression", no additional interactions from client device 120-1 may occur. In this event, no actual diversion of client device 120-1 from platform 104-1 to target platform 112 occurs. If many "impressions" occur without "conversion" (i.e. clicking on the campaign 404-1), then the campaign 404-1 may be deemed unsuccessful and/or ultimately be considered to have wasted the computing resources of platform 104-1 and client device 120-1, as well as wasting the network resources of network 108.

However, the generation of campaign 404-1 on client device 120-1 may also be followed by a "conversion", i.e. subsequent selection or "clicking on" the campaign 404-1 during session 904, which would also trigger activation of token 704-1. "Clicking-on" is represented by arrow "B" in FIG. 9. Such a conversion is noted according to block 332 which comprises monitoring product traffic. Product traffic according to block 332 occurs upon triggering token 704-1 which causes a message 908 to be sent to optimization engine 124 from device 120-1. The transmission of the message 908 is represented by a dashed line with an arrow terminating at optimization engine 124. The dashed line representing the transmission is labelled with a "C" to indicate that the transmission of message 908 occurs after the initiation of session 904. The message 908 includes consumer identifier object 148-1, campaign identifier sub-object 700-1 and its corresponding linkage to campaign identifier 136-1.

A person of skill in the art will now recognize how the campaign traffic and product monitoring functionality can massively scale for tracking, via messages, sent each time a client device 120 accesses a given campaign, and thereby uniquely track different consumer identifier objects 148 with different campaigns 404 as deployed on different platforms 104. Such tracking can be performed via optimization-reporting application 162, which can also perform tracking functions across all platform-reporting applications 154 to create normalized reporting of all traffic relating to campaign 400 as deployed as campaigns 404 across a plurality of publisher platforms 104.

Figure 10:
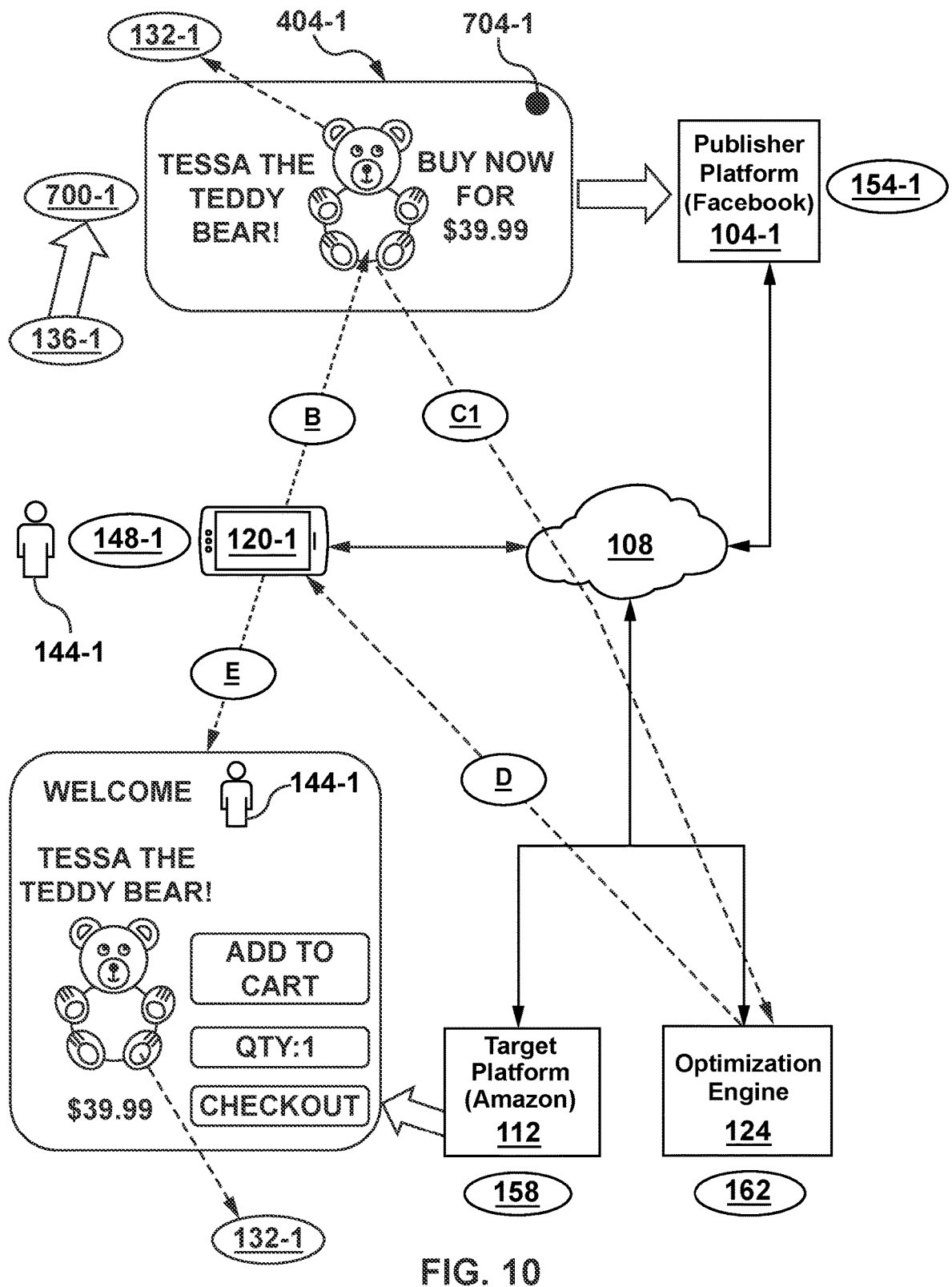
FIG. 10 shows another example of monitoring traffic.

Explanation of block 332 continues in relation to FIG. 10. FIG. 10 continues the example events of FIG. 9, based on the assumption that input is received at device 120-1 indicating a selection of campaign 404-1 and an intention to be diverted to target platform 112. As noted, this input is represented by a dashed line with an arrow labelled "B". In other words, FIG. 10 represents the fulfillment of the diversion event whereby client device 120-1 is diverting its communications from publisher-platform 104-1 to target platform 112 and an intention to access the customer experience sales funnel respective to product identifier object 132-1. (The fact of this selection is also captured by platform-reporting application 154-1 in the usual fashion.)

Device 120-1 is temporarily directed to optimization engine 124 as represented by the dashed line with an arrow labelled "C1". (Line "C" and line "C1" can be combined in a programming environment, or separated, but are shown separately here for illustrative purposes.) Optimization-reporting application 162 continues recording this diversion event. Optimization engine 124 thus redirects client device 120-1 to target platform 112, and specifically to an "offer for sale" screen specific to product identifier object 132-1 that is tailored to consumer 144-1. The redirection is represented by the dashed line with an arrow labelled "D", while the accessing of the "offer for sale" screen by device 120-1 is represented by the dashed line with an arrow labelled "E".

A person of skill in the art will now recognize how the functionality in FIG. 10 can massively scale for tracking each time a client device 120 is actually diverted to target platform 112, and thereby uniquely record such diversions for different consumer identifier objects 148 with different campaigns 404 as deployed on different platforms 104. Such tracking can be performed via optimization-reporting application 162, which can also track at optimization engine 124 across all platform-reporting applications 154 and/or target-reporting application 158 to create normalized reporting of all traffic relating to overall campaign 400 as deployed as sub-campaigns 404 across a plurality of publisher platforms 104.

A person of skill in the art will also now recognize that the functionality in FIG. 10 can comprise bringing device 120-1 to any point in the customer experience sales funnel, depending on where a particular consumer entity 144 may have left off during a previous session with target platform 112. It is particularly contemplated that a first interaction with platforms 104 may divert the client device 120 the "offer for sale" portion of the funnel, which may lead to an "add to cart" interaction with target platform 112 before client device 120 terminates that session with target platform 112. Thus, during a subsequent interaction with platforms 104, the same campaign can bring the client device 120 directly to the "checkout" portion of the funnel, having tracked the prior "add to cart" interaction.

Figure 11:
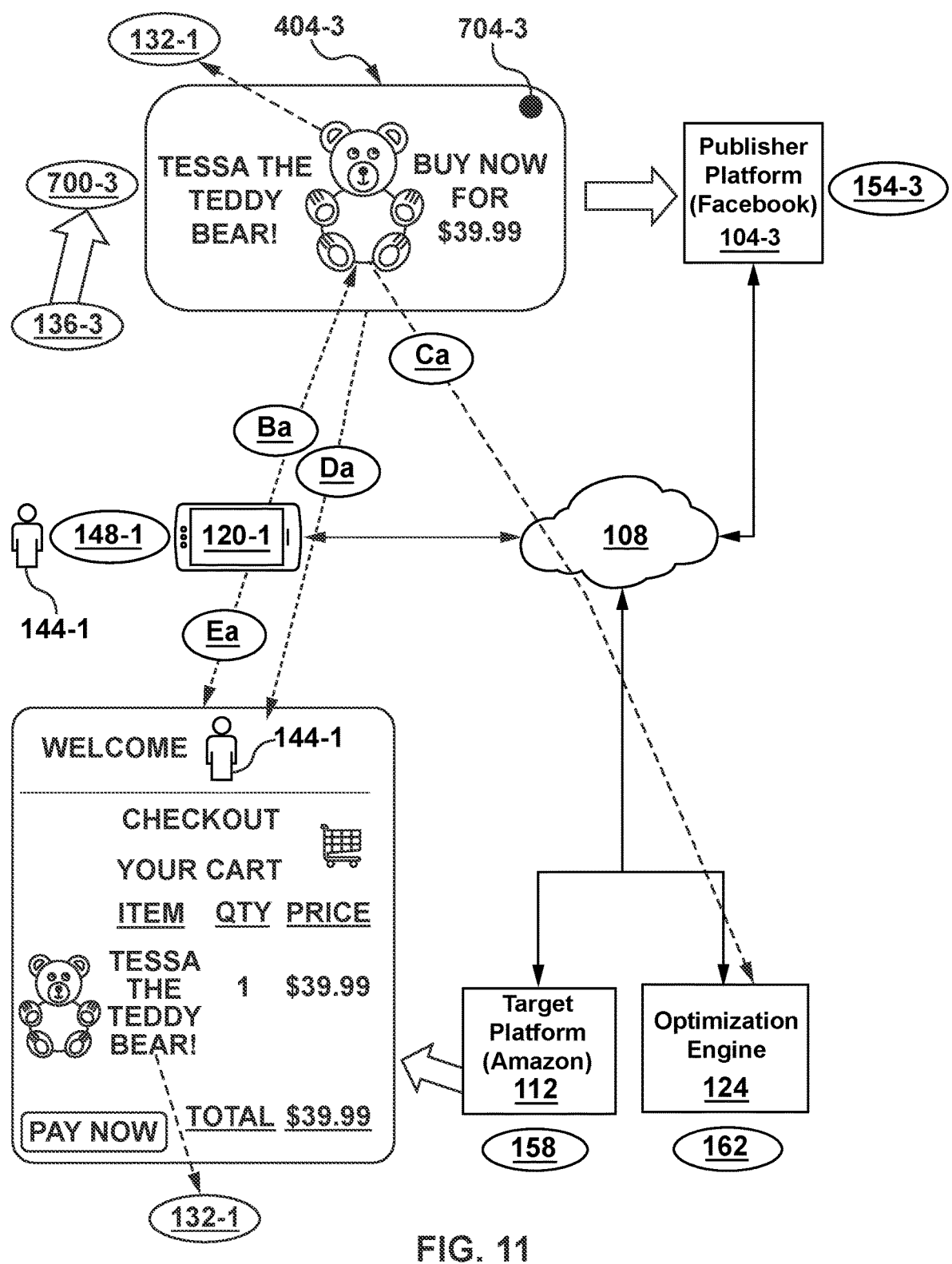
FIG. 11 shows another example of monitoring traffic.

FIG. 11 illustrates such a subsequent interaction and reiterates the functionality of FIG. 10. FIG. 11 thus continues the events of FIG. 10. Recall FIG. 10 shows an "offer for sale" portion of the funnel, which allows an "add to cart" interaction. For the example in FIG. 11, it is assumed that "add to cart" input was received to add a single product from FIG. 10, but the "checkout" process was not initiated. In FIG. 11, client device 120-1 accesses a different platform 104-3 carrying its variant of campaign 400 in the form of campaign 404-3 that is tailored to Google Ads. Flows in FIG. 11 are also indicated with dashed lines, and labelled with same lettering scheme except followed by the suffix "a". Thus dashed line Ba of FIG. 11 is analogous to dashed line B of FIG. 10; dashed line Ca is analogous to dashed line C1 of FIG. 10, etc. Notably, however dashed line Da represents a direct diversion from platform 104-3 to target platform 112, while dashed line Ea represents bringing client device 120 directly to the "checkout" portion of the funnel.

Recall that dashed line C1 in FIG. 10 showed an initial diversion to optimization engine 124, which supports the functionality of certain publisher platforms 104 which normally divert traffic directly to a given target platform, such as target platform 112. Thus dashed line C and dashed line D permit optimization engine 124 to track the activity of device 120-1, while also fulfilling the ultimate diversion to target platform 112 per dashed line E.

In contrast, dashed line Ca in FIG. 11 shows pure tracking event to optimization engine 124 while dashed line Da shows a direct diversion to target platform 112. Dashed line Ca and dashed line Da support the functionality of certain publisher platforms 104, notably Google Ads, which permits including both a tracking link to optimization engine 124 as well as a diversion link to target platform 112. Thus dashed line Ca and dashed line Da permit optimization engine 124 to track the activity of device 120-1, while also fulfilling the ultimate diversion to target platform 112 per dashed line Ea. These subtle distinctions in the behaviors shown in FIG. 9, FIG. 10 and FIG. 11 can be configured within the campaign identifier sub-objects 700 respective to the functionality of a given publisher platform 104.

Block 336 comprises the aforementioned normalization. Block 336 comprises normalizing campaign traffic data from block 328 with the product traffic data from block 332. Block 336 is performed by optimization-reporting application 162, which can access publisher-reporting applications 154 and target-reporting application 158 and combine data from all sources into a normalized reporting format that compares actual diversions from publisher platforms 104 to target platform 112, and to that end the success or failure of a given campaign 400 can be assessed by determining the frequency of access of a given campaign 400 and considering a threshold level below which the campaign is not considered successful. Normalization can include data formats and timing of events so that specific campaigns 400 can be measured against actual sales conversions on target platform 112.

Block 340 comprises determining whether to modify a given campaign. The determination can be based on the results of block 336. A "yes" determination can be made when a given publisher platform 104 shows greater diversions to target platform 112 than another publisher platform 104. (i.e. the threshold level fell below a given level.) A "yes" determination cycles through method 300 again, and thus at block 312 there is an opportunity to change the selection of publisher platforms 104 to favor publisher platforms 104 that lead to greater diversions to target platform 112. A "yes" determination may also occur when there are simply, as a whole, too few diversions to target platform 112, leading to a change in campaign content at block 304. The changes to the campaign content can also be based on changing the target demographic information 402.

It is also contemplated that a machine learning function can be implemented such that changes contemplated at block 340 as done manually can be captured in a neural network learning exercise such that future campaigns 400 can be compared to similarities in previous campaigns and thus the publisher selections at block 312 and/or campaign content at block 304 and/or demographic information 402 can be automatically selected and/or adjusted based on the output of such a neural network.

The one or more machine-learning algorithms and/or deep learning algorithms and/or neural networks may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. To be clear, any suitable machine-learning algorithm and/or deep learning algorithm and/or neural network is within the scope of present specification.

According to another embodiment, there is provided a method for optimizing network traffic. The method can be a variant on block 328, block 332, block 336 and block 340 of method 300. The method can also be viewed as a subset of method 300. Thus, a non-limiting example of the method of this embodiment is shown in FIG. 9 and FIG. 10. The method includes receiving a communication at an optimization engine, such as the optimization engine 124. The communication can originate from one of a plurality of publisher platforms 104, such as platform 104-1. Each of the publisher platforms can generate diversion content, such as campaign 400. The diversion content can include a link, such as token 704, that when selected at a client device causes the communication. The link further includes a target platform identifier, such as target platform 112, and a platform identifier of the source platform 104-1.

The method also includes determining a ranking of a frequency of access of the link for each of the plurality of content platforms. Block 336 and block 340 can be utilized as part of such a ranking determination.

The method also includes decreasing generation of the diversion content on a subset of the content platforms that fall below a threshold level of the frequency. The campaign modification discussion from block 340 can be utilized as part of the decreasing.

The foregoing method has been explained in relation to FIG. 9 and FIG. 10, but it is to be understood that this explanation is a non-limiting example only. Variants on the example of FIG. 9 and FIG. 10 example will occur to those skilled in the art.

A person skilled in the art will now appreciate that the teachings herein can improve the technological efficiency and computational and communication resource utilization across system 100 by limiting the dissemination of campaigns 400 to those publisher platforms 104 that have the greater number of diversions, thereby making more efficient use of network and processing resources in system 100.

In view of the above it will now be apparent that variants are contemplated. For example, the foregoing has been discussed in relation to products on e-commerce engines, it is also contemplated that e-commerce engines offering services are also contemplated.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. An optimization engine comprising a memory and a processor coupled to the memory; the processor configured to:
  receive a communication from one platform of a plurality of content platforms;
  each of the content platforms for generating diversion content that includes a link that when selected at a client device accessing the one platform causes the communication;
  the link further including a target platform identifier and a platform identifier of the one platform;

determine a ranking of a frequency of access of the link for each of the plurality of content platforms; and, decrease generation of the diversion content on a subset of the content platforms that fall below a threshold level of the frequency.

2. The optimization engine of claim 1 wherein the processor is configured to bias generation of the content towards a subset of content platforms that exceed the threshold level.

3. The optimization engine of claim 1 wherein the processor is further configured to cause the client device to divert access from the one platform to a target platform associated with the target platform identifier.

4. The optimization engine of claim 1 wherein the processor is further configured to receive a client device identifier for storage in the memory for causing the client device to divert access from the one platform to a different location on the target platform if the client device has previously accessed the link from any of the content platforms.

5. The optimization engine of claim 4 wherein the client device identifier includes a user identifier and the demographics are associated with a user associated with the user identifier.

6. The optimization engine of claim 1 wherein the content platforms generate primary content respective to the platform and the diversion content is generated alongside a subset of the primary content by client devices associated with certain demographics that favor the primary content.

7. The optimization engine of claim 5 wherein the demographics are adjusted to favor different primary content on the same platforms when the threshold falls below a certain level.

8. The optimization engine of claim 1 wherein the link is based on a hidden pixel embedded inside the diversion content and the diversion content is an advertisement for a product being sold on the target platform.

9. The optimization engine of claim 1 wherein the ranking is based on a correlation between a normalization of disparately formatted reports from at least one of the target platform and the content platforms.

10. A method for network traffic monitoring and optimizing comprising:

receiving a communication from one platform of a plurality of content platforms;

each of the content platforms generating diversion content that includes a link that when selected at a client device accessing the one platform causes the communication; the link further including a target platform identifier and a platform identifier of the one platform;

determining a ranking of a frequency of access of the link for each of the plurality of content platforms based; and, decrease generation of the diversion content on a subset of the content platforms that fall below a threshold level of the frequency.

11. The method of claim 10 further comprising biasing generation of the content towards a subset of the content platforms that exceed the threshold level.

12. The method of claim 10 further comprising biasing causing the client device to divert access from the one platform to a target platform associated with the target platform identifier.

13. The method of claim 10 further comprising receiving a client device identifier for storage for causing the client device to divert access from the one platform to a different location on the target platform if the client device has previously accessed the link from any of the content platforms.

14. The method of claim 13 wherein the target platform is an e-commerce platform including a shopping cart section that is accessed on a previous access of the link and checkout section on a subsequent access of the link.

15. The method of claim 10 further comprising generating primary content respective to the platform and the diversion content is generated alongside a subset of the primary content by client devices associated with certain demographics that favor the primary content.

16. The method of claim 15 wherein the client device identifier includes a user identifier and the demographics are associated with a user associated with the user identifier.

17. The method of claim 15 wherein the demographics are adjusted to favor different primary content on the same platforms when the threshold falls below a certain level.

18. The method of claim 10 wherein the link is based on a hidden pixel embedded inside the diversion content and the diversion content is an advertisement for a product being sold on the target platform.

19. The method of claim 10 wherein the ranking is based on a correlation between a normalization of disparately formatted reports from at least one of the target platform and the content platforms.

20. The method of claim 10 wherein the diversion content is based on a single advertising campaign and uniquely formatted according to technical requirements of each content platform.

\* \* \* \* \*